Aug. 26, 1924.

R. P. PESCARA 1,506,716

HELICOPTER STEERING AND STABILIZING MECHANISM

Filed Dec. 29, 1921   5 Sheets-Sheet 1

Inventor
R. P. Pescara

Aug. 26, 1924.  
R. P. PESCARA  
1,506,716  
HELICOPTER STEERING AND STABILIZING MECHANISM  
Filed Dec. 29, 1921  5 Sheets-Sheet 2

Inventor  
R. P. Pescara

Aug. 26, 1924.

R. P. PESCARA 1,506,716

HELICOPTER STEERING AND STABILIZING MECHANISM

Filed Dec. 29, 1921   5 Sheets-Sheet 3

Inventor
R. P. Pescara

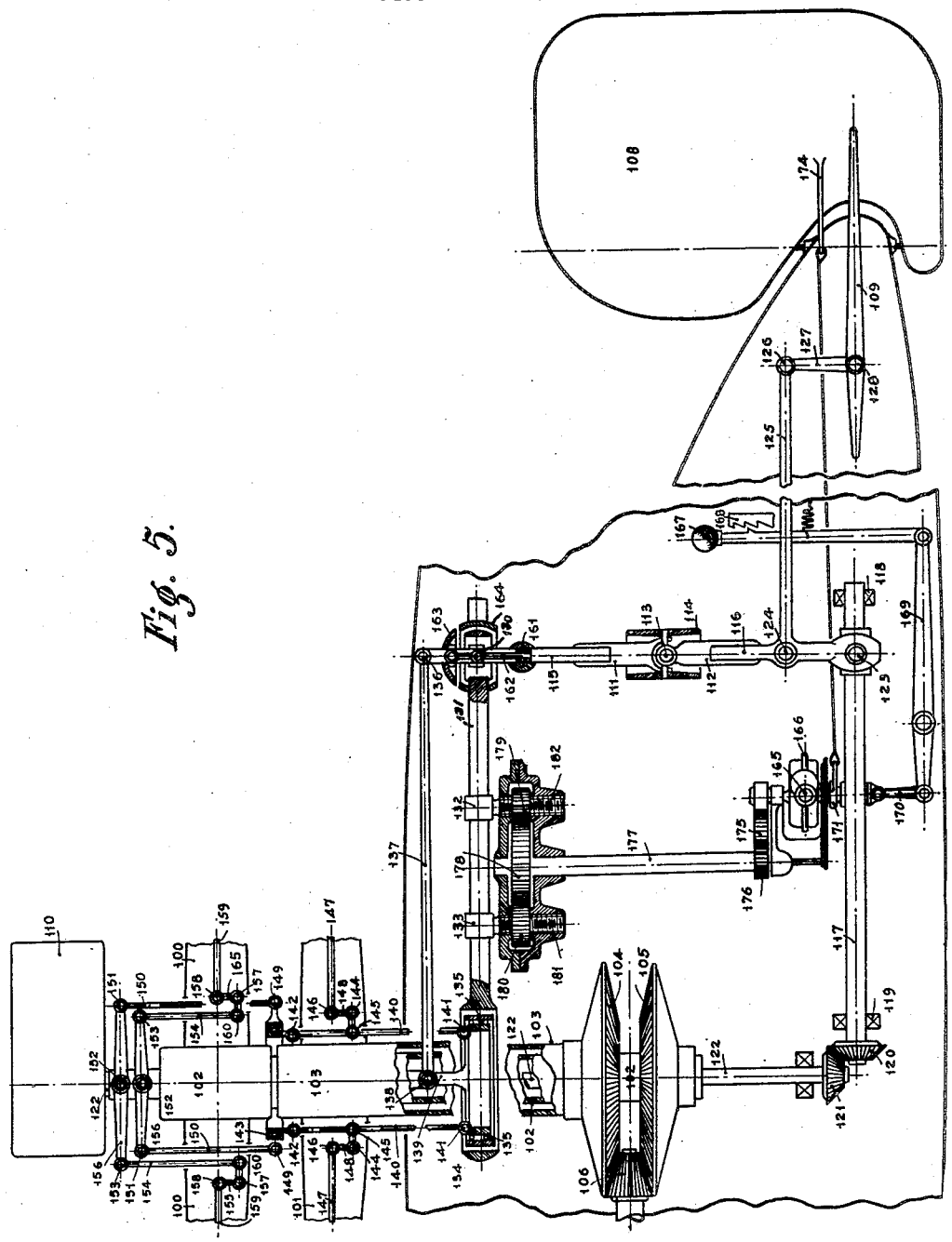

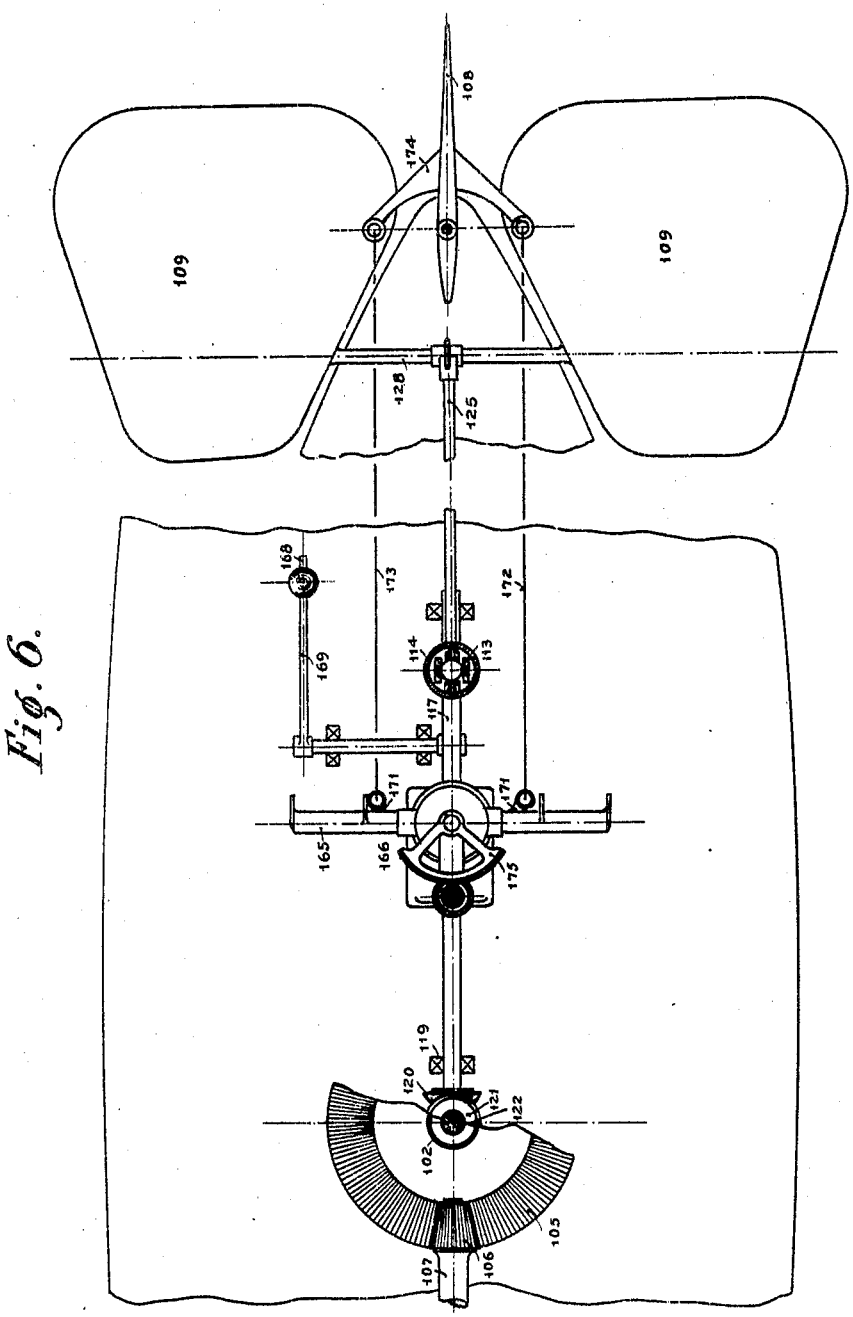

Patented Aug. 26, 1924.

1,506,716

UNITED STATES PATENT OFFICE.

RAUL PATERAS PESCARA, OF BARCELONA, SPAIN.

HELICOPTER STEERING AND STABILIZING MECHANISM.

Application filed December 29, 1921. Serial No. 525,732.

*To all whom it may concern:*

Be it known that I, RAUL PATERAS PESCARA, a citizen of the Argentine Republic, of 20 Calle de la Buena Suerte, Barcelona, Spain, have invented a Helicopter Steering and Stabilizing Mechanism, of which the following is a specification.

The invention relates to an improvement in flying machines of the helicopter type and particularly to a mechanism for controlling the steering and stabilization selectively or in combination.

The invention is illustrated in the accompanying drawings, in which:

Fig. 5 is a view in elevation showing a modified control system.

Fig. 6 is a plan of the same.

Figure 1:
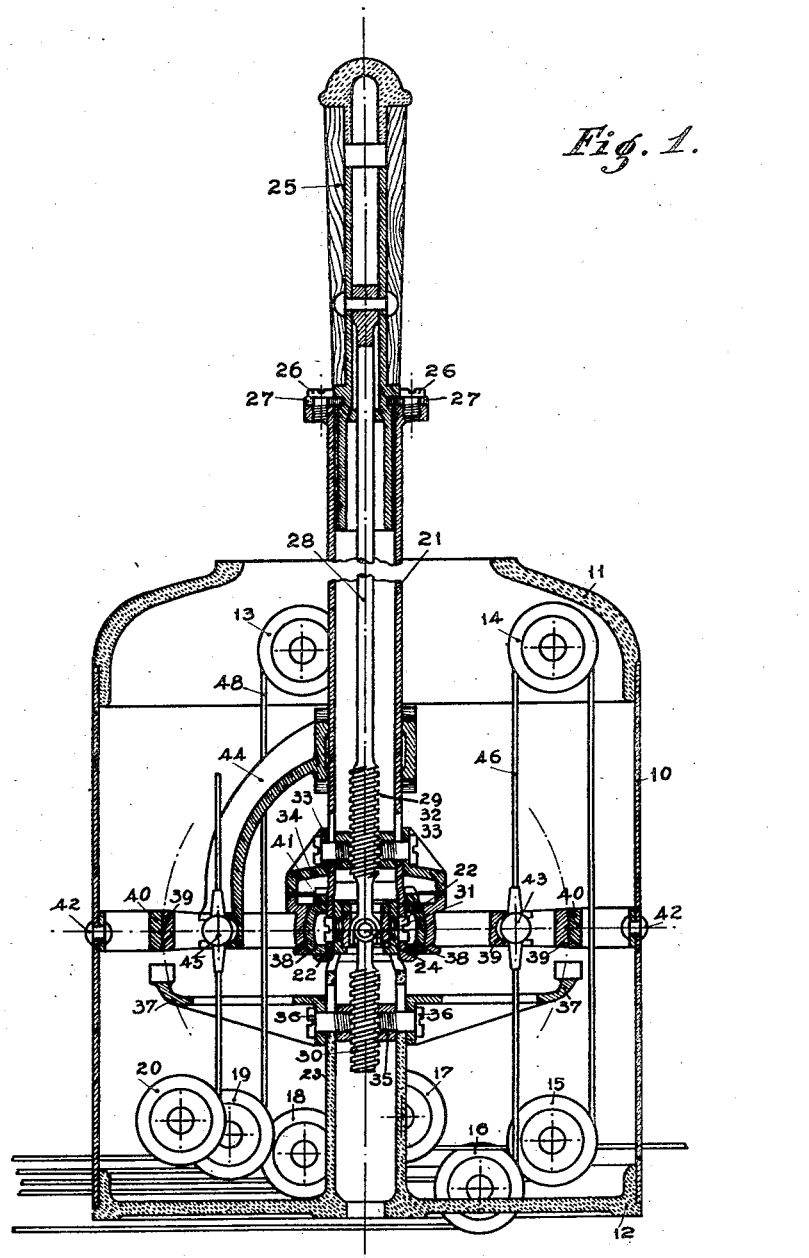
Fig. 1 is a sectional view partly in elevation illustrating the manually operable portions of the control means.
Figure 2:
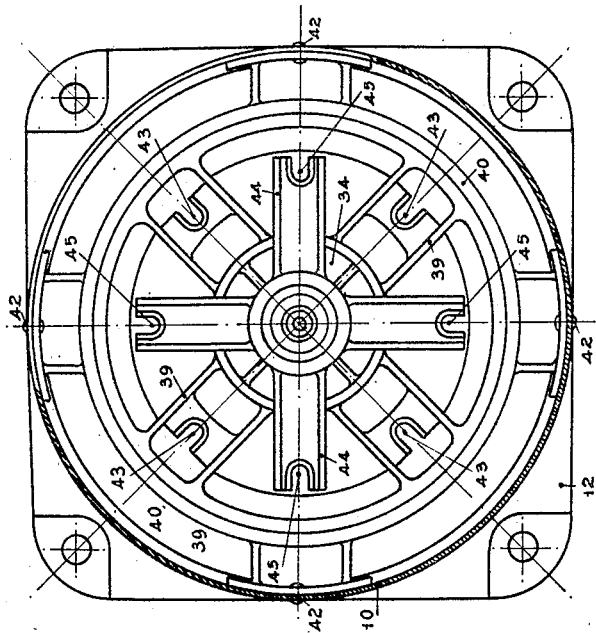
Fig. 2 is a transverse section taken just above the central portion of Fig. 1.
Figure 3:
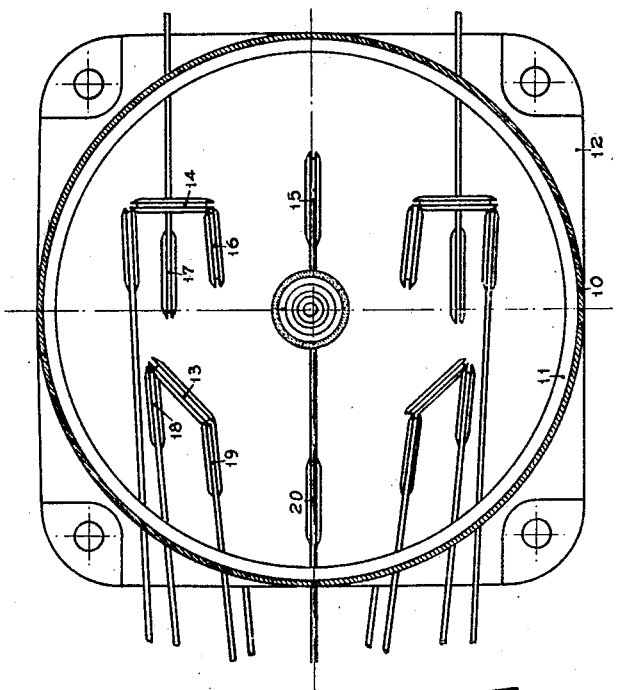
Fig. 3 is a transverse section taken below the central portion of Fig. 1.

The manually operable elements of the control system, are shown more particularly in Figs. 1, 2, and 3, wherein at an appropriate point in the body or car of the aeroplane is arranged a cylindrical casing 10, having a base 12 and an upper section 11, both particularly constructed to provide bearing supports for various cable pulleys 13, 14, 15, 16, 17, 18, 19, and 20. Arranged centrally of the casing and extending through the upper section 11, is a tube 21 serving as a portion of what is known as the joy stick, the lower end of this tube being mounted upon a Cardan joint 22, by which it is connected to a tubular upright 23 rising from the base section 12. Thus the joy stick is freely movable in all directions about the central point 24 of the Cardan joint. A handle 25 by which the tube 21 is operated has an extension fitted within the upper end of the tube and connected to said tube by screws 26, which pass through a washer 27 bearing upon the upper end of the tube and underlying an annular projection on the handle, the screws taking into an annular flange on the upper end of the tube. Thus the handle may swing the tube in any direction or may be rotated independently of the tube at will. A rod 28 is connected to the handle proper and formed near its lower end with a threaded portion 29 and at its lower with a similar threaded portion 30. The rod intermediate the threaded portions is formed in two sections connected by the Cardan joint. A section 32 fits slidably within the tube 21 and is interiorly threaded to cooperate with the threaded portion 29 of the rod 28, this section 32 being connected by screws 33 passing through slots formed in the tube and engaging a dome section 34. A similar nut section 35 is arranged to cooperate with the lower threaded section 30 of the rod 28 and is slidable within the tube, being connected to an outer dome 37 by screws 36, with the latter passing through slots in the tube. Concentric with the Cardan joint 22 are annular sections 38, 39, and 40. The section 38 is secured to the tube through the medium of a nut 41, and the outermost section 40 is fixed to the casing 10 by radial lugs secured to the casing by rivets 42. The intermediate section 39 bears between the sections 38 and 40 and the meeting faces are concentric with the Cardan joint. Section 39 is provided with four cleats or radial extensions 43, to which are secured the cables as 46 for controlling the decentralization of the propeller thrusts. A supporting section 44 is secured exterior to the tube 21 and has four sections depending therefrom and arranged normally in the plane of the section 39, intermediate the radial projections 43, these extensions 45 from the section 44 serving to provide means for securing the cables as 48 for controlling the rudders.

Figure 4:
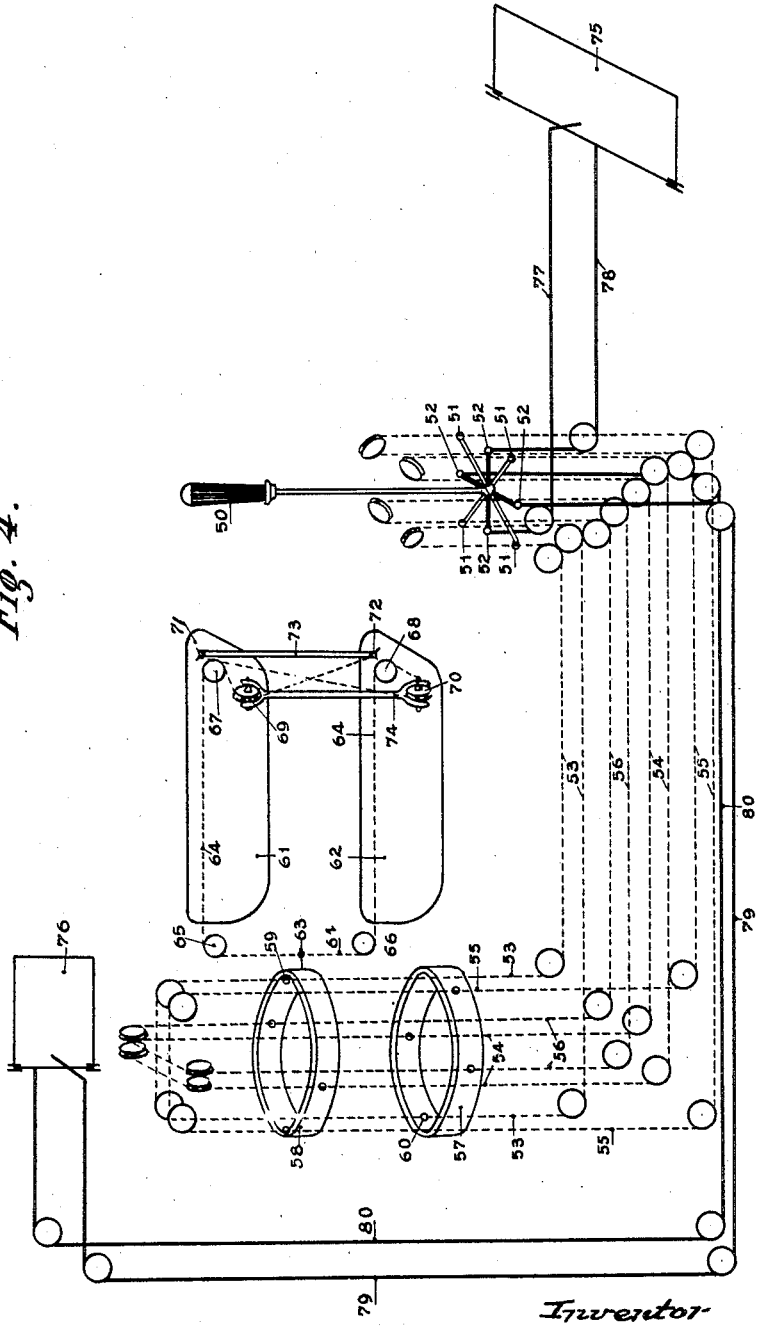
Fig. 4 is a view in more or less diagrammatic form illustrating the action of the various control cables.

In the diagrammatic illustration of Fig. 4, the arrangement of the various cables for the control of the decentralizing of the propeller thrusts and of the rudders will be apparent. In this figure, the connections 51 correspond to the connections 43 of Fig. 1, that is, the connections for the cables for the decentralizing of the propeller thrusts, while the sections marked 52 correspond to the connections indicated at 45 in Figs. 1 and 2 for the rudder control cables. For the decentralizing, cables indicated at 53, 54, 55, and 56, guided in their course by various guiding pulleys, are connected in advance of each propeller and in the plane of rotation to a ball bearing of large diameter indicated graphically at 57 and 58. Each control cable is connected in its rising portion to the inner ring of one of these ball bearings and in its descending portion to the inner ring of the other of such ball bearings. For example, circuit 53 is attached in its rising portion to the inner ring of ball bearing 58 and in its descent portion to the inner ring of ball bearing 57 as at 60. These connections to the respective ball bearings of any one cable are arranged in the same vertical plane passing through the common axis of the bearings. These ball bearings are connected to the general frame work of the aeroplane by means of joints, of any desired general formation, which permit of the bearings being inclined in any direction around a fixed point, with that point the intersection of the plane of rotation with the axis of the propellers. If, therefore, the joy stick be inclined, the planes of the ball bearings will assume a position parallel to the inclination of the section 39. These ball bearings are thus inclined and control the decentralizing of the thrusts of the propellers in the following manner. 61 and 62 represent blades of a propeller and there is provided a cable 64, which passes over guide pulleys 65, 66, 67, 68, 69, and 70. A rigid blade strut 74 supports the axles of the pulleys 69 and 70, and the ends of the cables are connected to the respective ends of a corresponding strut 73, arranged at the ends of the blades. The cable 64 is connected by a rigid connection to the outer ring of the ball bearing, as for example 58, and it is apparent that if this ball bearing is inclined that the blades in their rotation about the axis of the apparatus, which is the axis of rotation of the ball bearings, the connector 63 will rise and fall in following the path of the inclined ball bearing. The cable 64 will move correspondingly and will therefore deform or warp the surfaces of the blades as will be evident. This change of course is periodic as the cable 64 is moved downwardly and then upwardly during the rotation of the blades about their axis, so that the thrust of the blades will be greater at one point for example than at the directly opposite point. As all blades are similarly controlled, it is apparent that the thrust will no longer pass through the axes of the propellers and will be decentralized. Te rudder control connections indicated in Figs. 1 and 2 at 45 and in Fig. 4 at 52, will be fully obvious from the arrangement of the cables 77 and 78 in their connection with the vertical motion rudder 75 and by the arrangement of the cables 79 and 80 and their connection with the balancing rudder 76.

Referring again to the specific construction shown in Figs. 1, 2, and 3, it will be noted that the movement of the joy stick will correspondingly move the section 39 for the control of the propeller thrust and the section 44 for the control of the rudders at will. However, it is inadvisable during rapid flight to utilize the decentralizing thrust control, and therefore means must be provided for cutting out this control without affecting the rudder control. The control of the decentralizing thrust by the joy stick is accomplished by fixing the section 39 so that it can be moved selectively by the joy stick, and held rigid with relation to the joy stick. This is accomplished through the medium of the dome 34, which when moved downward through the rotation of the rod 28 and the corresponding and lowering of the nut section 32, is brought into contact with an edge flange of the section 39, thus fixing the section 39 with relation to the joy stick so far as compelling said section to follow all movements of the joy stick is concerned. If, on the contrary, the warping mechanism is not to be controlled but to remain independent of the movement of the joy stick, the handle is rotated so as to cause the dome 34 to rise and at the same time move upwardly the dome 37. The upward movement of the dome 34 will relieve the section 39 from control by the joy stick while the movement of the dome 37 by engaging the sections 39 and 40, will maintain the section 39 in its horizontal position and prevent its further movement.

Figs. 5 and 6 represent a similar system to that described except that the operating members are rigid as distinguished from cable connections. With particular reference to these figures, the propeller blades are shown at 100 and 101, their respective hubs 102, 103 being concentric and the propellers operated in reverse directions through bevel gears 104, 105, operated by pinion 106, with its axis fixed with relation to the frame work of the aeroplane. The aeroplane is provided with a steering rudder 108, a horizontal control rudder 109, and a balancing rudder 110. In this form of the apparatus, the joy stick is composed of two tubular sections 111, 112, connected by a Cardan joint 113 and provided with a handle 114. Tube 111 has telescopic relation with a tube 115 while tube 112 has telescopic relation with a tube 116, the arrangement being such that through the use of the handle 114, it is possible to move the tubes 111 and 112 downwardly so as to avoid influencing the tube 115 without sacrificing the influence on tube 116.

The tube 116 is for rudder control and is connected at 123, at its lower end, to a shaft 117 supported for axial rotation in guides 118, 119. One end of this shaft is provided with a bevel pinion 120 cooperating with a bevel pinion 121 arranged on the lower end of a shaft 122, which extends vertically within the hollow hubs of the propellers and carries the balancing rudder 110 at the upper end. Tube 116 is connected at 124 to a rearwardly extending arm 125, which is in turn connected at 126 to a depending arm 127, adapted to turn a suitably supported shaft 128, on the ends of which are secured the horizontal control rudders 109. The steering rudder 108 is controlled through other mechanism and will be later described in connection with that mechanism.

The decentralization of the thrust of the blades of the propellers is controlled in the following manner: The tube 115 is connected by an axle 130 within the enlarged portion of a shaft 131 supported in ring guides 132, 133, and formed at its opposite end to present an enlargement 134 to receive a ball bearing 135. The outer part of the ball bearing is connected to the enlargement 134 by an axial support perpendicular to the part 134 as shown in Fig. 5. Thus, if the tube 115 is inclined in any direction, the support 134 and therefore the bearing 135 will place itself perpendicular to that direction. The inner member of the ball bearing 135 is provided at diametrically opposite points with rods 140 which extend upwardly above the lower propeller and are connected at 142 to the inner member of a ball bearing 143 corresponding to the ball bearing 135, and by reason of the rods 140, compelled to move in unison with the ball bearing 135. The blades of the lower propeller are provided with warp controlling rods 147, and these are connected at 146 with depending arms 148, which latter are pivotally connected at 144 to rods 145 which are in turn connected to rods 140. The outer member of the ball bearing 143 is provided at diametrically opposite points with rods 150, one of which is connected above the propeller to one end of a lever 156 pivotally supported at 152 on the hub 102. The other rod 150 is connected to the opposed end 151 of an upper lever 156 pivotally connected at 152 to the hub 102. Thus the outer members of the ball bearings 143 are connected to opposed ends of separate levers. The end of the lower lever 156 opposite that to which the rod 150 is connected, is provided with a depending rod 154 to a blade warping rod 159 through the medium of arms 160, 155, pivotally connected respectively to the rods 154 and 159 by the connection 157. The end of the upper lever 156 opposite the connection of rod 150 thereto is similarly connected to the remaining blade of the upper propeller by rods 154, 160, 155, the latter being connected by joint 157 and the rod 155 connected to the warping rod 159 by joint 158.

With respect to this particular detail of construction, it will be apparent that the inclination of the ball bearing 135 and the corresponding inclination of the ball bearing 143 will, through the medium of levers and rods described, compel a warping of the respective blades of the propellers, it being apparent that this warping of the opposed blades of the respective propellers will be reversed or in opposition.

It is desirable to provide means for cutting out this warping control at will, and to this end the tube 115 is provided with a handle 161 slidable thereon, which is in turn connected by rod 162 within the hollow tube to a cap piece 163 which may be drawn down upon the part circular casing surrounding the lever connection of the tube with the shaft 131 and so prevent movement of said lever connection and shaft, this detail being quite similar to the corresponding detail in the form previously described.

To the upper end of the tube 115 are connected tie rods 137, which at 138 are connected to levers secured to the outer hub of the bearing 135, thus controlling the inclination of the bearing 135 through movement of the tube 115.

The specific construction being described also includes an additional means for steering control, which comprises a rocking lever 169 controlled by a handle 167 and operating through a rod 170 to control the position of a triple clutch of any conventional form and here indicated conventionally as at 166. This clutch when in one position connects the apparatus with shaft 165 which in turn through arms 171 is connected by cables 172, 173, to arms 174 projecting in opposite directions from the steering rudder 108, thereby permitting this rudder to be controlled. In another position of the clutch, the rocking lever will operate a segment 175 and through the connection therewith of a pinion 176 on the lower end of a rod 177, operate through a gear 178 on the upper end of said rod two diametrically opposed pinions 179, 180, arranged in a suitable casing. These pinions have threaded cooperation with stems 181, 182, carrying at their upper ends the guide bearings 133, 132 respectively for the shaft 131. The movements of these guide bearings are transmitted to the support 134 for the ball bearing 135, thereby providing a permanent warping of the blades of the propellers which is independent of the periodic control of this character. This permanent adjustment or warping control is reversed in the respective propellers, as will be apparent, that is to say, as the angle of attack is increased in the upper propeller it is diminished in the lower propeller and vice versa. The clutch control through the locking lever 169 is provided for in arranging the handle 167 with a projection adapted to be seated in any one of three notches formed in a fixture 168, the particular notch engaged defining the clutch control.

What I claim is:

1. An aeroplane having helicopter propellers, means for warping said propellers, rudders for the aeroplanes, means for operating the rudders, and an adjustable joy stick adapted in one position of adjustment to control the warping means and in another position of adjustment to control the rudder operating means.

2. An aeroplane having helicopter propellers, means for warping said propellers, rudders for the aeroplane, means for operating the rudders, an adjustable joy stick adapted in one position of adjustment to control the warping means and in another position of adjustment to control the rudder operating means, and means whereby the warping means may be locked out when the joy stick is in that position adapted for the control of the rudder operating means.

3. An aeroplane having helicopter propellers, means for warping said propellers, rudders for the aeroplanes, means for operating the rudders, a joy stick adapted to control the warping means and the rudder operating means, and means operated by the joy stick for locking out the warping means at will.

4. An aeroplane having helicopter propellers, means for compelling a periodic warping of the blades of said propellers with said warping reversed in diametrically opposed positions of the blades, mechanism for controlling the warping means, a member to which said mechanism is connected, a joy stick, means operated by the joy stick for shifting said member, and means carried by the joy stick for freeing said member from the control of the joy stick.

5. An aeroplane having helicopter propellers, means for compelling a periodic warping of the blades of said propellers with said warping reversed in diametrically opposed positions of the blades, mechanism for controlling the warping means, a member to which said mechanism is connected, a joy stick, means operated by the joy stick for shifting said member, means carried by the joy stick for freeing said member from the control of the joy stick, and means operated by the joy stick for locking said member against movement.

In testimony, that he claims the foregoing as his invention, he has signed his name in presence of two subscribing witnesses.

RAUL PATERAS PESCARA.

Witnesses:
  Dr. Augustine Valle,
  Angel M. Vaule.